United States Patent
Alameh et al.

(10) Patent No.: US 10,885,294 B2
(45) Date of Patent: Jan. 5, 2021

(54) FINGER PRINT SENSOR WITH PASSIVE PROXIMITY DETECTION FOR POWER SAVINGS IN AN ELECTRONIC DEVICE

(71) Applicant: Motorola Mobility LLC, Chicago, IL (US)

(72) Inventors: Rachid M Alameh, Crystal Lake, IL (US); Paul Steuer, Hawthorn Woods, IL (US)

(73) Assignee: Motorola Mobility LLC, Chicago, IL (US)

( * ) Notice: Subject to any disclaimer, the term of this patent is extended or adjusted under 35 U.S.C. 154(b) by 638 days.

(21) Appl. No.: 14/711,833

(22) Filed: May 14, 2015

(65) Prior Publication Data

US 2016/0335471 A1    Nov. 17, 2016

(51) Int. Cl.
*G06K 9/00* (2006.01)
*G06F 1/3234* (2019.01)
*G06F 1/3231* (2019.01)
*G09G 5/00* (2006.01)

(52) U.S. Cl.
CPC ....... *G06K 9/00013* (2013.01); *G06F 1/3231* (2013.01); *G06F 1/3262* (2013.01); *G09G 5/00* (2013.01); *G09G 2330/022* (2013.01); *G09G 2354/00* (2013.01)

(58) Field of Classification Search
None
See application file for complete search history.

(56) References Cited

U.S. PATENT DOCUMENTS

| | | |
|---|---|---|
| 6,327,376 B1 | 12/2001 | Harkin |
| 8,773,405 B1 | 7/2014 | Ryshtun |
| 2001/0036297 A1 | 11/2001 | Ikegami et al. |
| 2003/0141959 A1* | 7/2003 | Keogh ............... E05B 65/0075 340/5.53 |
| 2005/0063571 A1* | 3/2005 | Setlak ................ G06K 9/0002 382/124 |
| 2009/0318198 A1 | 12/2009 | Carroll |
| 2011/0050643 A1* | 3/2011 | Zhao .................. G06F 3/03547 345/175 |
| 2011/0092779 A1* | 4/2011 | Chang .................. A61B 5/021 600/301 |
| 2013/0076485 A1* | 3/2013 | Mullins ................. G06F 21/32 340/5.83 |
| 2013/0129163 A1 | 5/2013 | Chung |
| 2013/0307818 A1 | 11/2013 | Pope |

(Continued)

OTHER PUBLICATIONS

"Excelitas Technologies Corp.", "Digital Thermopiles"; DigiPile Family; www.excelitas.com, May 31, 2011, 4 pages.
Slaby, Jiri et al., "Fingerprint Sensor with Proximity Detection, and Corresponding Devices, Systems, and Methods", U.S. Appl. No. 14/919,020, filed Oct. 21, 2015.
Vazquez Colon, Maria , "Final OA", U.S. Appl. No. 14/919,020, filed Oct. 21, 2015; Mailed Feb. 6, 2018.

(Continued)

*Primary Examiner* — Kaitlin A Retallick
(74) *Attorney, Agent, or Firm* — Philip H. Burrus, IV

(57) ABSTRACT

An electronic device includes a housing, a user interface, and one or more processors operable with the user interface. The user interface includes a fingerprint sensor proximately located with at least one proximity sensor component. The proximity sensor component can include an infrared signal receiver to receive an infrared emission from an object external to the housing. The proximity detector component is to actuate the fingerprint sensor when the infrared signal receiver receives the infrared emission from the object.

20 Claims, 8 Drawing Sheets

(56) References Cited

U.S. PATENT DOCUMENTS

| | | | |
|---|---|---|---|
| 2014/0077673 A1* | 3/2014 | Garg | G06K 9/00053 |
| | | | 312/237 |
| 2015/0146944 A1* | 5/2015 | Pi | G06F 21/83 |
| | | | 382/124 |
| 2015/0371074 A1 | 12/2015 | Lin | |
| 2016/0004899 A1 | 1/2016 | Pi | |
| 2016/0180184 A1 | 6/2016 | Vieta | |
| 2016/0335471 A1 | 11/2016 | Alameh | |
| 2017/0061193 A1 | 3/2017 | Young et al. | |
| 2017/0116454 A1 | 4/2017 | Slaby | |
| 2017/0116455 A1 | 4/2017 | Alameh | |
| 2017/0140195 A1 | 5/2017 | Wang et al. | |

OTHER PUBLICATIONS

Vazquez Colon, Maria, "Non-Final OA", U.S. Appl. No. 14/919,038, filed Oct. 21, 2015; Mailed Dec. 28, 2017.
Vazquez Colon, Maria E, "NonFinal OA", U.S. Appl. No. 14/919,020, filed Oct. 21, 2015; Mailed Jul. 27, 2017.
Vazquez Colon, Maria, "Final Office Action", U.S. Appl. No. 14/919,038, filed Oct. 21, 2015; dated Jun. 25, 2018.
Vazquez Colon, Maria, "NonFinal OA", U.S. Appl. No. 14/919,038, filed Oct. 21, 2015; Mailed Jan. 2, 2019.
Vazquez Colon, Maria, "Notice of Allowance", U.S. Appl. No. 14/919,020, filed Oct. 21, 2015; dated Sep. 5, 2018.
Vazquez Colon, Maria, "Notice of Allowance", U.S. Appl. No. 14/919,038, filed Oct. 21, 2015; dated Jul. 10, 2019.

* cited by examiner

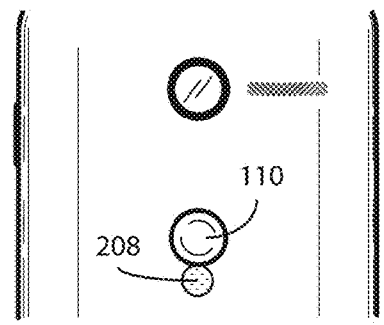
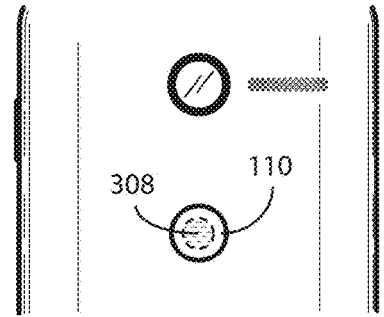
*FIG. 2*  *FIG. 3*
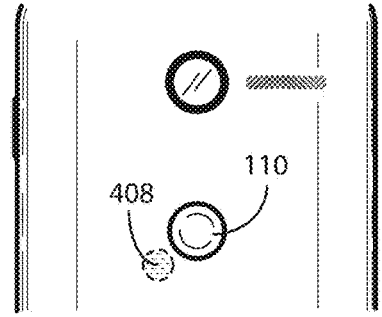
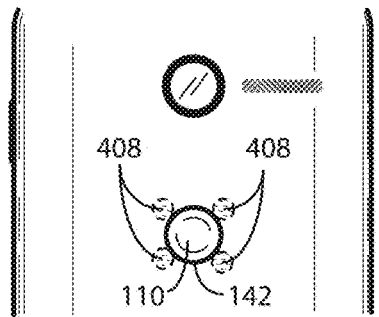
*FIG. 4*  *FIG. 5*
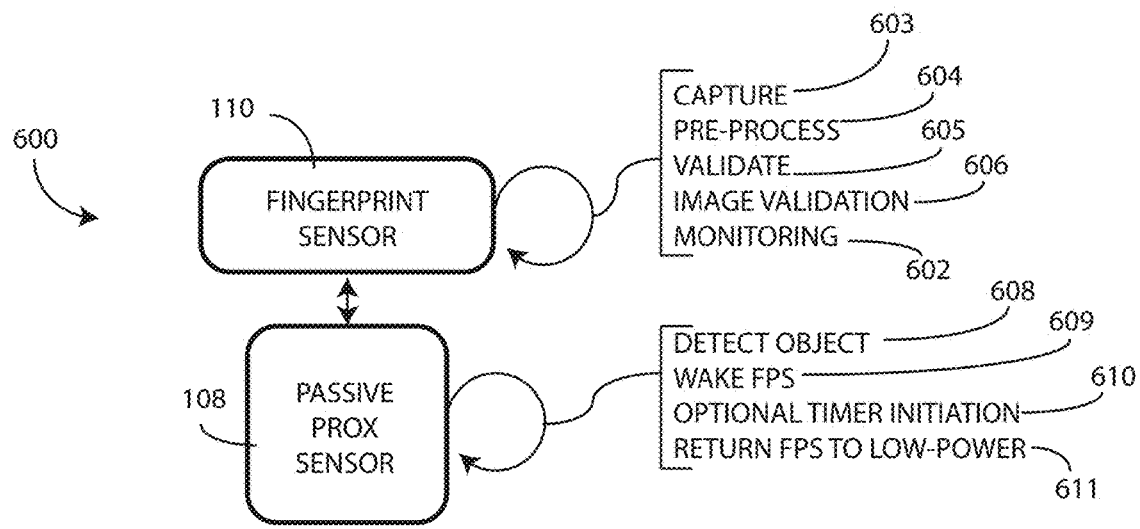
*FIG. 6*

FINGER PRINT SENSOR WITH PASSIVE PROXIMITY DETECTION FOR POWER SAVINGS IN AN ELECTRONIC DEVICE

BACKGROUND

Technical Field

This disclosure relates generally to electronic devices, and more particularly to portable electronic devices with biometric.

Background Art

Mobile electronic communication devices, such as mobile telephones, smart phones, gaming devices, and the like, are used by billions of people. The owners of such devices come from all walks of life. These owners use mobile communication devices for many different purposes including, but not limited to, voice communications, text messaging, Internet browsing, commerce such as banking, and social networking. The circumstances under which users of mobile communication device use their devices varies widely as well.

In using mobile communication devices for so many applications, a user is likely to have a wide variety of personal passcodes that are used to access the device, an application, or combinations thereof. Such passcodes are generally required to access personal information on an electronic device, access email, retrieve bank records, and so forth. Frequently these passcodes are required to meet strict security guidelines and can thus become lengthy and difficult to remember. Moreover, for security purposes, many devices and systems require the user to change each passcode on a regular basis. Accordingly, remembering all these passcodes can be difficult.

To alleviate this issue, some modern electronic devices are being equipped with biometric sensors. Rather than entering a passcode, a user touches or otherwise interacts with a biometric sensor to identify their identity and acquire access to a device or particular application. While biometric sensors may eliminate the need to memorize many different passcodes, they are not without issues of their own. For example, they can consume large amounts of power when not in use. It would be advantageous to have an improved system having a biometric sensor, yet with reduced power consumption for extended battery life.

BRIEF DESCRIPTION OF THE DRAWINGS

FIGS. 2-5 illustrate explanatory fingerprint sensors proximately located with at least one proximity sensor component configurations in accordance with one or more embodiments of the disclosure.

FIG. 6 illustrates one explanatory functional schematic block diagram in accordance with one or more embodiments of the disclosure.

Figure 1:
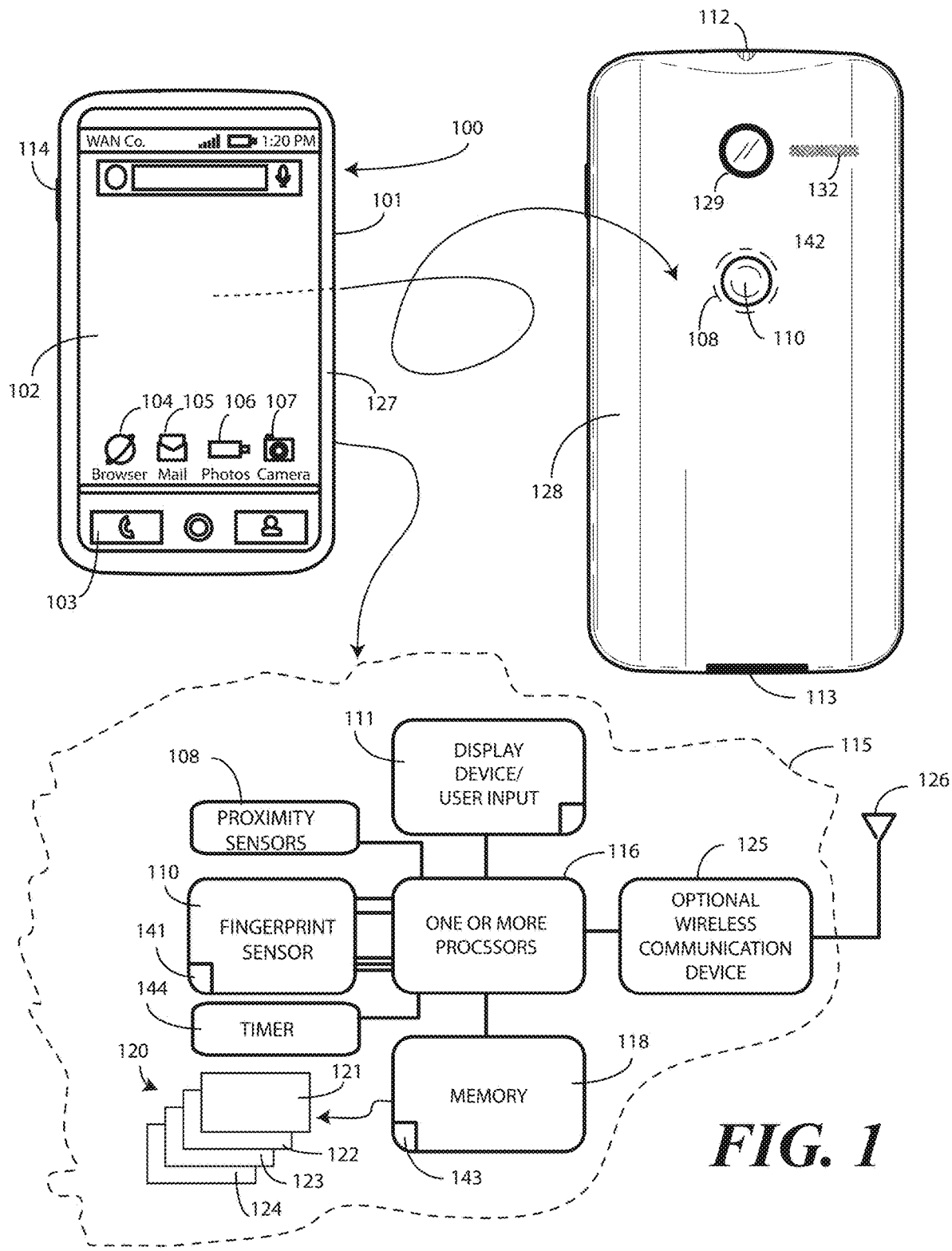
FIG. 1 illustrates one explanatory portable electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to using a fingerprint sensor proximately located with one or more proximity sensor components to control modes of operation of an electronic device. Any process descriptions or blocks in flow charts should be understood as representing modules, segments, or portions of code that include one or more executable instructions for implementing specific logical functions or steps in the process.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by reducing power consumption, extending run time, and improving the overall user experience to overcome problems specifically arising in the realm of the technology associated with electronic device user interaction.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of controlling fingerprint sensors and/or proximity sensors to control device operation as described herein. The non-processor circuits may include, but are not limited to, a radio receiver, a radio transmitter, signal drivers, clock circuits, power source circuits, and other user input devices. As such, these functions may be interpreted as steps of a method to perform device control in response to one or more proximity sensors components.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a proximity sensor component that is proximately located with a fingerprint sensor. In one embodiment, the at least one proximity sensor component comprises a receiver only, and does not include a corresponding transmitter. As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter.

Illustrating by example, in one the proximity sensor component comprises a signal receiver to receive signals from objects external to the housing of the electronic device. In one embodiment, the signal receiver is an infrared signal receiver to receive an infrared emission from an object such as a human being when the human is proximately located with the electronic device. In one or more embodiments, the proximity sensor component is configured to receive infrared wavelengths of about four to about ten micrometers. This wavelength range is advantageous in one or more embodiments in that it corresponds to the wavelength of heat emitted by the body of a human being. Additionally, detection of wavelengths in this range is possible from farther distances than, for example, would be the detection of reflected signals from the transmitter of a proximity detector component.

In one or more embodiments, one or more proximity sensor components are proximately located with the fingerprint sensor. As used here, "proximately" takes the ordinary English meaning of "close in space," as set forth in the New Oxford American Dictionary. For example, a proximity sensor component and the fingerprint sensor can be collocated in one embodiment. In another embodiment, the proximity sensor component and the fingerprint sensor can be adjacent to each other. In another embodiment, the proximity sensor component and the fingerprint sensor can be immediately adjacent to each other. In yet another embodiment, the proximity sensor component and the fingerprint sensor can be disposed within a small, predefined distance, such as a few millimeters from each other. One or many proximity sensor components can be proximately located with the fingerprint sensor. In one embodiment, a proximity sensor component and a fingerprint sensor are coupled to a common printed circuit board with the proximity sensor component and the fingerprint sensor in contact with each other.

In one embodiment, when no user is around, the electronic device enters a low-power or sleep mode. When in this mode, the fingerprint sensor and its associated circuitry are also in a low-power or sleep mode, thereby consuming very little—if any—current. However, while the fingerprint sensor is in a low-power or sleep mode, the proximity sensor component is in an active mode of operation. In one embodiment, the proximity sensor component comprises a single infrared signal receiver able to detect infrared emissions from a person. Accordingly, the proximity sensor component requires no transmitter since objects disposed external to the housing deliver emissions that are received by the infrared receiver. As no transmitter is required, the single proximity sensor component can operate at a very low power level. Simulations show that an infrared signal receiver can operate with a total current drain of just a few microamps.

When the infrared signal receiver receives an infrared emission from an object exterior to the housing of the electronic device, such as a user's hand or finger, in on embodiment one or the proximity sensor component is operable to actuate the fingerprint sensor to transition it from the low-power or sleep mode to an active mode of operation. In the active mode of operation, the fingerprint sensor is operable to capture and store fingerprint data from a user's finger. One or more processors operable with the fingerprint sensor can then compare the fingerprint data to reference data stored in memory to determine whether the fingerprint data substantially matches the reference data, thereby authenticating the user.

Accordingly, by proximately locating a proximity sensor component with a fingerprint sensor, the fingerprint sensor can be placed into a low-power or sleep mode to save power. As soon as the proximity sensor component detects a warm object, such as a hand or finger, the fingerprint sensor can be activated for user authentication. The inclusion of a proximity sensor component allows an electronic device to distinguish proximity input, i.e., "touchless input," from touch input when a user's hand is in close proximity, e.g., a few inches, from the housing of the electronic device. The fingerprint sensor can be transitioned from a low-power mode to a full-power, authentication mode by the proximity sensor component.

By waking the fingerprint sensor only in the presence of warm objects, the inclusion of the proximity sensor component advantageously prevents false authentication attempts that can occur when an electronic device comes into contact with electrically conductive materials that are not a part of the user. This problem, present in prior art electronic devices having conventional fingerprint sensors, wastes power and processing power. When using embodiments of the disclosure, the fingerprint sensor only authenticates users when a warm object is nearby.

Embodiments of the disclosure contemplate that power savings—and thus longer runtime on a single battery charge—can be achieved by causing the fingerprint sensor to enter a low power or sleep mode when the proximity sensor component fails to detect infrared or thermal emissions. However, in one or more embodiments the proximity sensor component can remain in an operational state continually, even while the device and/or fingerprint sensor is not in use. To reduce overall latency, in one or more embodiments the proximity sensor component can cause the fingerprint sensor to transition to an active mode to capture fingerprint data before the finger actually touches the fingerprint sensor. Optionally, the fingerprint sensor can perform additional functions in the active mode of operation, such as one or more pre-processing steps on the fingerprint data while the main processors of the electronic device are in a low power or sleep mode. Once the pre-processing of the fingerprint data is confirmed, either an auxiliary processor or the main processors of the electronic device can authenticate the fingerprint data by comparing it to a reference file stored in memory.

Turning now to FIG. 1, illustrated therein is one explanatory electronic device 100 configured in accordance with one or more embodiments of the disclosure. The electronic device 100 of FIG. 1 is a portable electronic device, and is shown as a smart phone for illustrative purposes. However, it should be obvious to those of ordinary skill in the art having the benefit of this disclosure that other electronic devices may be substituted for the explanatory smart phone of FIG. 1. For example, the electronic device 100 could equally be a conventional desktop computer, palm-top computer, a tablet computer, a gaming device, a media player, or other device.

This illustrative electronic device 100 includes a display 102, which may optionally be touch-sensitive. In one embodiment where the display 102 is touch-sensitive, the display 102 can serve as a primary user interface 111 of the electronic device 100. Users can deliver user input to the display 102 of such an embodiment by delivering touch input from a finger, stylus, or other objects disposed proximately with the display. In one embodiment, the display 102 is configured as an active matrix organic light emitting diode (AMOLED) display. However, it should be noted that other types of displays, including liquid crystal displays, would be obvious to those of ordinary skill in the art having the benefit of this disclosure.

The explanatory electronic device 100 of FIG. 1 includes a housing 101. In one embodiment, the housing 101 includes two housing members. A front housing member 127 is disposed about the periphery of the display 102 in one embodiment. A rear-housing member 128 forms the backside of the electronic device 100 in this illustrative embodiment and defines a rear major face of the electronic device. Features can be incorporated into the housing members 127,128. Examples of such features include an optional camera 129 or an optional speaker port 132, which are shown disposed on the rear major face of the electronic device 100 in this embodiment, but could be disposed along the front major face of the electronic device 100 as well about the display 102. In this illustrative embodiment, a fingerprint sensor 110 is disposed along the rear-housing member 128 on the backside of the electronic device 100. Note that in other embodiments, the fingerprint sensor 110 could be disposed along the front housing member 127 adjacent to the display 102 as well. In still other embodiments, the fingerprint sensor 110 could be disposed beneath the display 102, thereby allowing the user to place a finger on the display 102 for identification. In this latter case, performance may be improved by providing an aperture in the fascia of the electronic device to allow infrared or thermal emissions to reach the proximity sensor components.

In one embodiment, the fingerprint sensor 110 can be a single function device. In other embodiments, the fingerprint sensor 110 can be a dual or multifunction device. Illustrating by example, in one embodiment the fingerprint sensor 110 is solely responsible for receiving biometric data from a user and either authenticating the user or determining that the user is unauthorized to use the electronic device 100. This would be a single function fingerprint sensor.

In other embodiments, the fingerprint sensor 110 may be capable of performing multiple functions. Again illustrating by example, in one embodiment the fingerprint sensor 110 can receive biometric data from a user and either authenticate the user or determine that the user is unauthorized to use the electronic device 100. However, the fingerprint sensor 110 may also be configured as a push and/or touch button. Thus, by touching the fingerprint sensor 110 the user may deliver biometric data only. However, by touching and pressing the fingerprint sensor 110, the fingerprint sensor 110 may both authenticate the user by receiving the biometric data from touch input and perform a second function in response to the push button being depressed. An example of the second function may be causing the one or more processors 116 to exit a low power or sleep mode.

Where the fingerprint sensor 110 is instead a single function device, another user control, such as push button 114, may be included for performing the second function. Thus, in such an embodiment the user may touch the fingerprint sensor 110 to deliver biometric data and press the push button 114 or other user control to cause the one or more processors 116 to exit the low power or sleep mode. In one or more embodiments, simultaneous activation of the fingerprint sensor 110 and the push button 114 may be required. For example, a user may have to press the push button 114 with one finger while touching the fingerprint sensor 110 with another finger to access all operational features of the electronic device 100. In other embodiments, these processes, i.e., touching the fingerprint sensor 110 and pressing the push button 114, may need to be performed in a specific order to properly unlock the electronic device 100 and access the features of the one or more processors 116. In still other embodiments, no particular order of these processes may be required so long as both are performed within a predetermined time of each other. Other modes of unlocking an accessing the electronic device 100 will be obvious to those of ordinary skill in the art having the benefit of this disclosure.

In one embodiment, the electronic device 100 includes one or more connectors 112,113, which can include an analog connector, a digital connector, or combinations thereof. In this illustrative embodiment, connector 112 is an analog connector disposed on a first edge, i.e., the top edge, of the electronic device 100, while connector 113 is a digital connector disposed on a second edge opposite the first edge, which is the bottom edge in this embodiment.

A block diagram schematic 115 of the electronic device 100 is also shown in FIG. 1. In one embodiment, the electronic device 100 includes one or more processors 116. In one embodiment, the one or more processors 116 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 118, can optionally store the executable software code used by the one or more processors 116 during operation.

In this illustrative embodiment, the electronic device 100 also includes a communication circuit 125 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 125 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 125 can include wireless communication circuitry, one of a receiver, a transmitter, or transceiver, and one or more antennas 126.

The fingerprint sensor 110 is operable with the one or more processors 116 in one or more embodiments. In one embodiment, the fingerprint sensor 110 includes its own processor 141 to perform various functions, including detecting a finger touching the fingerprint sensor 110, capturing and storing fingerprint data from the finger, performing at least one pre-processing step while the one or more processors 116 is in a low power or sleep mode, and upon receiving a request from the one or more processors 116 for the fingerprint data, delivering the fingerprint data to the one or more processors 116. In one or more embodiments the processor 141 of the fingerprint sensor 110 can, as one pre-processing step, perform a preliminary authentication of the user by comparing fingerprint data captured by the fingerprint sensor 110 to a reference file stored in memory 118. The processor 141 of the fingerprint sensor 110 can be an on-board processor. Alternatively, the processor 141 can be a secondary processor that is external to, but operable with, the fingerprint sensor in another embodiment. Other configurations will be obvious to those of ordinary skill in the art having the benefit of this disclosure.

In one embodiment, the fingerprint sensor 110 can include an array of pixels. The fingerprint sensor 110 can be a complementary metal-oxide-semiconductor active pixel sensor digital imager or any other fingerprint sensor. The fingerprint sensor 110 can be configured to capture a live scan of a fingerprint pattern from a finger disposed along its surface, and to store this information as fingerprint data from the user's finger. The fingerprint sensor 110 may also be able to capture one or more images. The images can correspond to an area beneath a surface of skin. The fingerprint sensor 110 can compare the fingerprint data or skin images to one or more references to authenticate a user in an authentication process.

In one embodiment, one or more proximity sensor components 108 plurality of proximity sensor components 108 can be proximately located with the fingerprint sensor 110. For example, in one embodiment the fingerprint sensor 110 is collocated with the proximity sensor component 108. In another embodiment, the fingerprint sensor 110 is adjacent to the proximity sensor component 108. In another embodiment, the fingerprint sensor 110 is immediately adjacent to the proximity sensor component 108. Some of these configurations will be illustrated below with reference to FIGS. 2-5. Still others will be obvious to those of ordinary skill in the art having the benefit of this disclosure. In the illustrative embodiment of FIG. 1, the proximity sensor component 108 is disposed about a perimeter 142 of the finger print sensor 110.

In one embodiment, the proximity sensor component 108 or components are operable with the one or more processors 116. In one embodiment, the one or more proximity sensor components 108 comprise only signal receivers. In one embodiment, the one or more proximity sensor components 108 comprise a single proximity sensor component. In one embodiment, the proximity sensor component 108 comprises an infrared receiver. For example, in one embodiment the proximity sensor component 108 comprises one or more signal receivers that receive infrared wavelengths of about 860 nanometers.

In one embodiment, the proximity sensor component 108 has a relatively long detection range so as to detect heat emanating from a person's body when that person is within a predefined thermal reception radius. For example, the proximity sensor component may be able to detect a person's body heat from a distance of about ten feet in one or more embodiments. However, the signal receiver of the proximity sensor component 108 can operate at various sensitivity levels so as to cause the at least one proximity sensor component 108 to be operable to receive the infrared emissions from different distances. For example, the one or more processors 116 can cause the proximity sensor component 108 to operate another sensitivity, which is less than the first sensitivity, so as to receive infrared emissions from a second distance, which is less than the first distance. In other embodiments, the proximity sensor component 108 can be designed to have changing detection thresholds controlled by the one or more processors 116.

In one embodiment, the proximity sensor component 108 comprises an infrared signal receiver so as to be able to detect infrared emissions from a person. This is sometimes referred to as a "passive IR system" due to the fact that the person is the active transmitter. Accordingly, the proximity sensor component 108 requires no transmitter since objects disposed external to the housing deliver emissions that are received by the infrared receiver. As no transmitter is required, each proximity sensor component 108 can operate at a very low power level, which is typically less than ten microamps per sensor. Simulations show that a group of infrared signal receivers can operate with a total current drain of just a few microamps.

The one or more processors 116 can be responsible for performing the primary functions of the electronic device 100. For example, in one embodiment the one or more processors 116 comprise one or more circuits operable with one or more user interface devices 111, which can include the display 102, to present presentation information to a user. The executable software code used by the one or more processors 116 can be configured as one or more modules 120 that are operable with the one or more processors 116. Such modules 120 can store instructions, control algorithms, and so forth.

In one embodiment, the one or more processors 116 are responsible for running the operating system environment 121. The operating system environment 121 can include a kernel 122 and one or more drivers, and an application service layer 123, and an application layer 124. The operating system environment 121 can be configured as executable code operating on one or more processors or control circuits of the electronic device 100.

The application layer 124 can be responsible for executing application service modules.

The application service modules may support one or more applications or "apps." Examples of such applications shown in FIG. 1 include a cellular telephone application 103 for making voice telephone calls, a web browsing application 104 configured to allow the user to view webpages on the display 102 of the electronic device 100, an electronic mail application 105 configured to send and receive electronic mail, a photo application 106 configured to permit the user to view images or video on the display 102 of electronic device 100, and a camera application 107 configured to capture still (and optionally video) images. These applications are illustrative only, as others will be obvious to one of ordinary skill in the art having the benefit of this disclosure. The applications of the application layer 124 can be configured as clients of the application service layer 123 to communicate with services through application program interfaces (APIs), messages, events, or other inter-process communication interfaces. Where auxiliary processors are used, they can be used to execute input/output functions, actuate user feedback devices, and so forth.

In one or more embodiments, the fingerprint sensor 110 and the one or more processors 116 can be placed into a low power or sleep mode when the electronic device 100 is not in use. When the one or more processors 116 are in the low power or sleep mode, the display 102 may be OFF and the various applications will not be operational.

By contrast, in one or more embodiments when the fingerprint sensor 110 is in the low-power or sleep mode, the proximity sensor component 108 may be left in a continually operational mode. Said differently, in one or more embodiments the proximity sensor component 108 is to operate in an operational mode while the fingerprint sensor 110 is in the low power or sleep mode to conserve power. As the proximity sensor component 108 consumes relatively low power, battery life and overall device runtime are extended.

The proximity sensor component 108 is configured to detect a finger or other object within a predetermined distance, such as a few inches, from the fingerprint sensor 110. When the infrared sensor of the proximity sensor component 108 receives infrared emissions from a warm object external to the housing 101, such as a user's finger, the one or more proximity sensor components 108 are to actuate the fingerprint sensor 110. In one embodiment, the one or more proximity sensor components 108 actuate the fingerprint sensor 110 by transitioning the fingerprint sensor 110 from the low-power or sleep mode to an active mode of operation. When in the active mode of operation, the fingerprint sensor 110 is to capture and store fingerprint data from the finger. Either the processor 141 of the fingerprint sensor 110, or alternatively the one or more processors 116, can compare the fingerprint data to reference data 143 stored in the memory 118 to determine whether the fingerprint data substantially matches the reference data to authenticate a user.

In one or more embodiments, the proximity sensor component 108 can optionally arm the fingerprint sensor 110 upon receiving an infrared emission from an object external to the housing, as well as actuate the one or more processors 116 prior to a user touching the fingerprint sensor 110. For example, when the electronic device 100 is unlocked and operational, there may be little or no need for biometric authentication via the fingerprint sensor 110. Accordingly, the one or more processors 116 may disarm the fingerprint sensor 110. Where the fingerprint sensor 110 is a dual or multifunction device, secondary or other functionality may remain operational when the fingerprint sensor 110 is disarmed. For instance, a user may still be able to press the push button of the dual action fingerprint sensor to take a photograph. In many instances when the one or more processors 116 enter the low power or sleep mode, they may lock the electronic device 100 and the fingerprint sensor 110 to conserve power. Accordingly, in one or more embodiments the proximity sensor component 108 arms and/or activates the fingerprint sensor 110 upon receiving thermal emissions from an object external to the housing.

In one embodiment, the electronic device 100 can include a timer 144. In one embodiment, when the proximity sensor component 108 receives an infrared emission, and the proximity sensor component 108 transitions the fingerprint sensor 110 to the active mode of operation, any of the proximity sensor component 108, the one or more processors 116, or the processor 141 of the fingerprint sensor 110 can initiate the timer 144. If the fingerprint sensor 110 fails to capture and store the fingerprint data prior to expiration of the timer 144, the fingerprint sensor 110 can transition back to the low-power or sleep mode. Including the timer 144 ensures that the fingerprint sensor 110 does not stay ON where, for example, a user merely passes a hand over the electronic device 100 and triggering the proximity sensor component 108.

Turning now to FIGS. 2-5, illustrated therein are various explanatory fingerprint sensor and proximity sensor component configurations. As noted above, the proximity sensor component 108 of FIG. 1 was disposed about a perimeter 142 of the fingerprint sensor 110. By contrast, in FIG. 2 a single proximity sensor component 208 is disposed immediately adjacent to the fingerprint sensor 110, with sides of the single proximity sensor component 208 and the fingerprint sensor abutting. In FIG. 3, a single proximity sensor component 308 is collocated with the fingerprint sensor 110. In FIG. 4, the proximity sensor component 408 is adjacent to the fingerprint sensor 110, with one being separated from the other by a millimeter or two. In FIG. 5, a plurality of proximity sensor components 408 are disposed immediately adjacent to a perimeter 142 of the fingerprint sensor 110. It should be noted that while FIGS. 2-4 included only a single proximity sensor component 208,308,408, they could have included multiple proximity sensor components as well. Also, the embodiments of FIGS. 2-5 are explanatory only, as others will be obvious to those of ordinary skill in the art having the benefit of this disclosure.

Turning now to FIG. 6, illustrated therein a functional diagram 400 indicating which functions occur where the fingerprint sensor 110 is operating in conjunction with one or more proximity sensor components 108 in one or more embodiments of the disclosure. In this embodiment, the proximity sensor component 108 comprises an infrared signal receiver proximately located with the fingerprint sensor 110.

The proximity sensor component 108 is operable to detect objects 608 external to the housing of an electronic device by receiving infrared emissions. When this occurs, the proximity sensor component 108 can transition 609 the fingerprint sensor 110 from a low-power or sleep mode to an active mode of operation. Additionally, the proximity sensor component 108 can initiate 610 a timer when the infrared signal receiver receives the infrared emission.

The fingerprint sensor 110 can then capture 603 and store fingerprint data from a finger coming into contact with the fingerprint sensor 110. The fingerprint sensor 110 can optionally pre-process 604 the fingerprint data. Examples of capturing and pre-processing steps include monitoring 602 the fingerprint sensor 110 to detect a finger proximately located with the fingerprint sensor 110 and capturing 603 fingerprint data. The capturing and pre-processing steps can also include noise filtering or other pre-processing steps.

The capturing and pre-processing steps can further include validating 605 whether an object proximately located with the fingerprint sensor 110 is actually a finger rather than another inanimate object such as a key ring, lipstick case, or other object. The capturing and pre-processing steps can also include image validation 606. The image validation 606 can include determining if the fingerprint data is of sufficient quality so as to successfully make it through the matching and control steps occurring in either the one or more processors (116) of the electronic device or a processor (141) of the fingerprint sensor 110. In other embodiments, where multiple sets of the fingerprint data exists, the image validation 606 can include comparing the second object or fingerprint data to primary object or fingerprint data and deleting a lesser quality one of the second object or fingerprint data and the primary object or fingerprint data.

In some situations, the proximity sensor component 108 will cause the fingerprint sensor 110 to enter the active mode. However, no finger will touch the fingerprint sensor 110. Such a situation can arise where a user waves their hand near the device without touching it. The proximity sensor component will receive infrared emissions, but the user will not touch the fingerprint sensor 110. Accordingly, when the proximity sensor component 108 initiates the timer, and where the fingerprint sensor fails to capture and store fingerprint data prior to expiration of the timer, the proximity sensor component 108, or one or more processors operational therewith, can transition 611 the fingerprint sensor 110 from the active mode to the low-power or sleep mode. The fingerprint sensor 110 can then operate in the low-power or sleep mode until the proximity sensor component detects another warm object by receiving infrared emissions.

Figure 7:
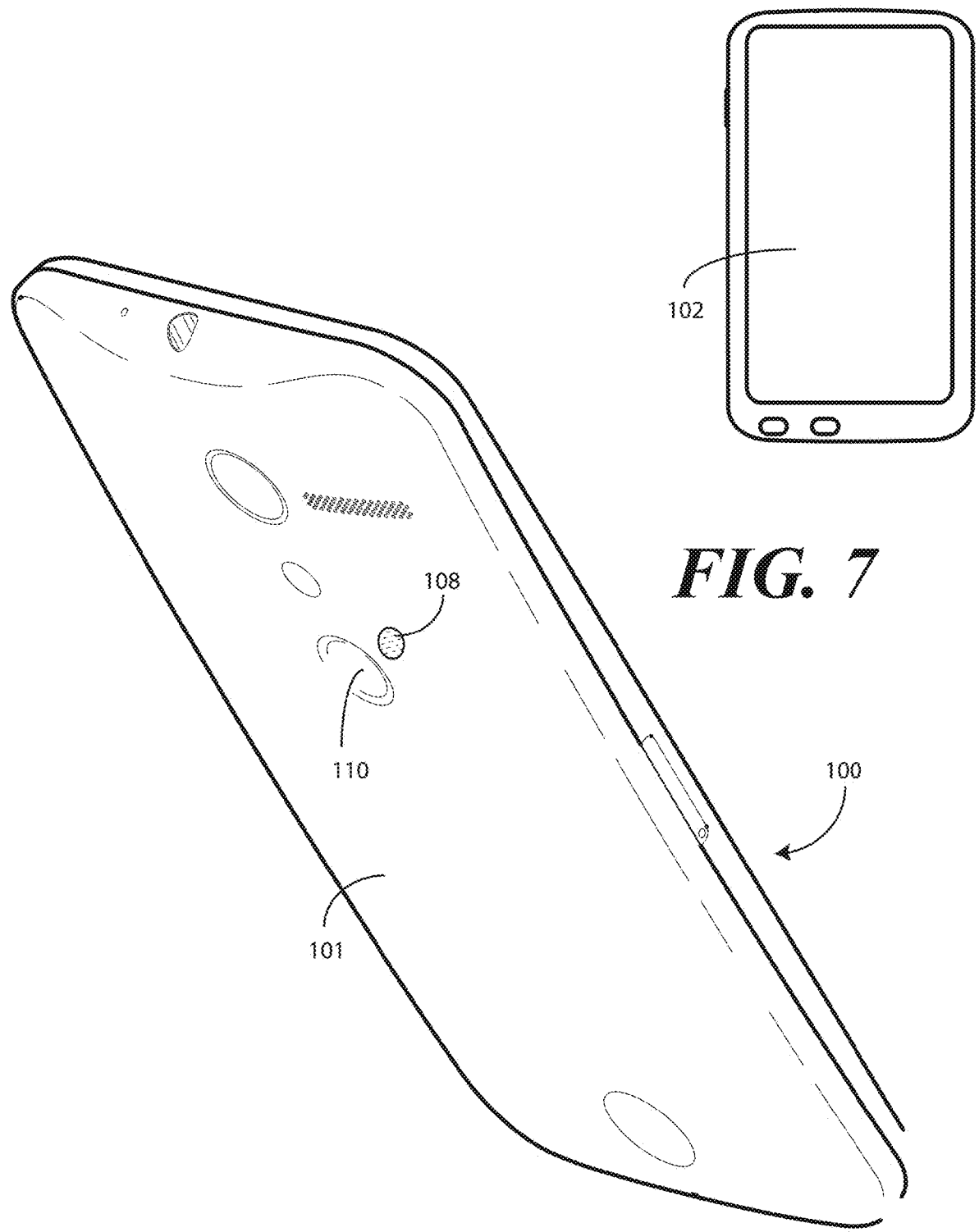
FIG. 7 illustrates one explanatory portable electronic device in accordance with one or more embodiments of the disclosure.

Now that the basic operation of embodiments of the disclosure have been described, a few use cases will briefly be described to illustrate one embodiment of the disclosure in action. Beginning with FIG. 7, an electronic device 100 has entered a low-power or sleep mode. This can occur when a user does not interact with the electronic device 100 for a predefined period of time. When in this mode, the display 102 is blank as the one or more processors (116) have entered a low power or sleep mode. When this occurs, in one embodiment the fingerprint sensor 110 is also placed into a low-power or sleep mode to conserve power. However, one or more proximity sensor components 108 proximately located with the fingerprint sensor 110 are in their active mode of operation to detect objects external to the housing 101 of the electronic device 100 by receiving infrared emissions.

Figure 8:
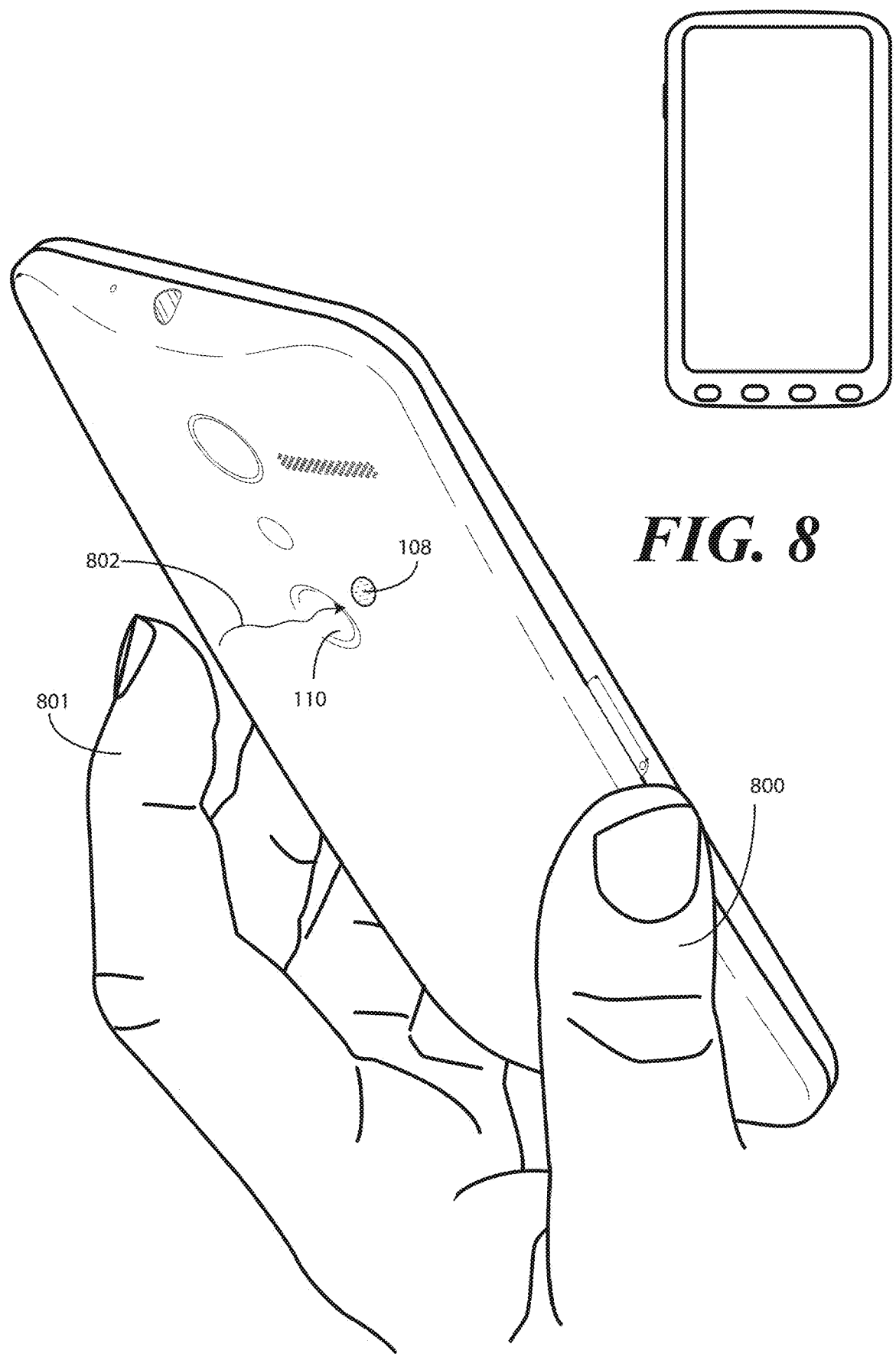
FIG. 8 illustrates one or more explanatory method steps using a portable electronic device in accordance with one or more embodiments of the disclosure.
Figure 9:
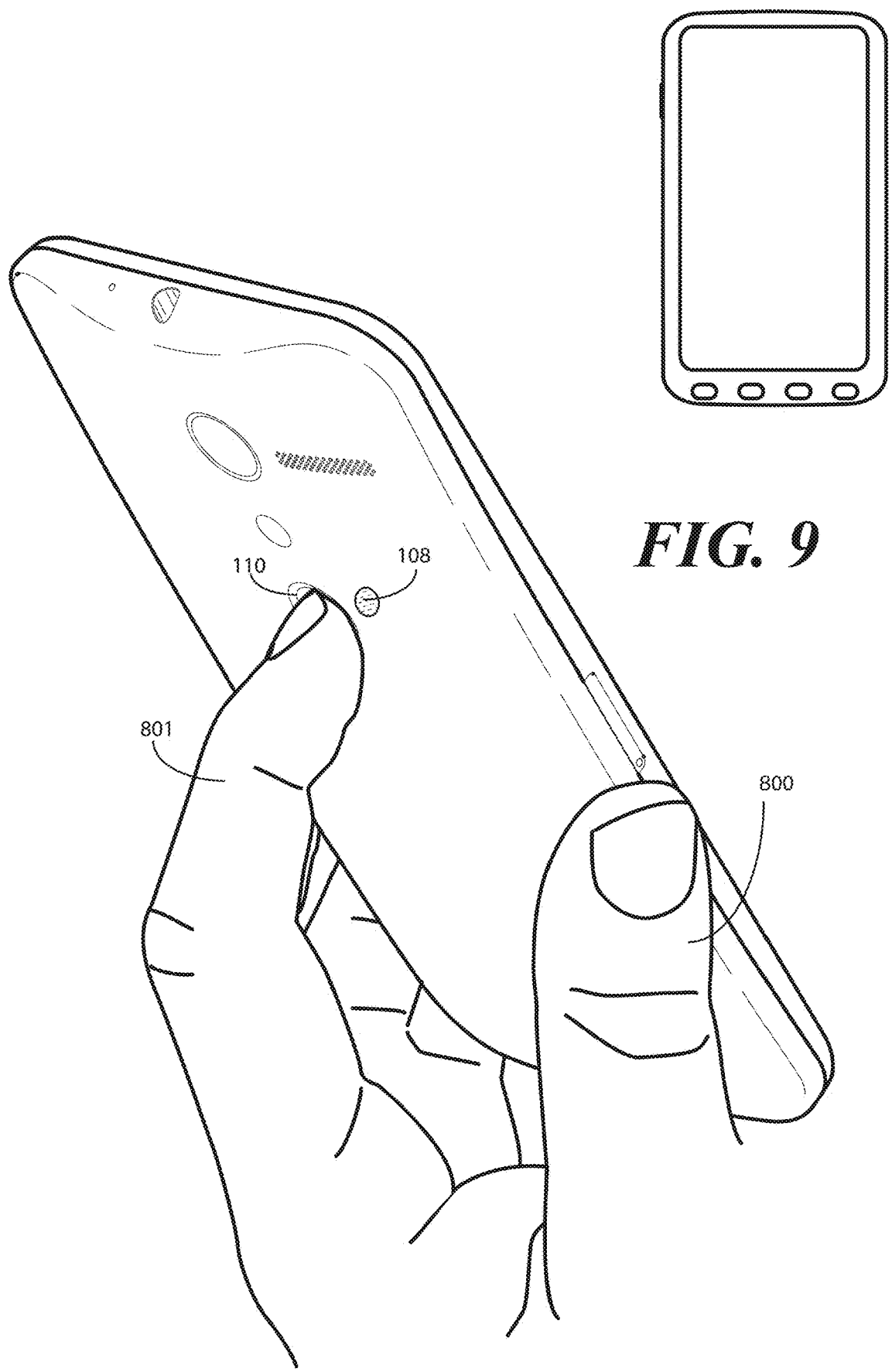
FIG. 9 illustrates one or more explanatory method steps using a portable electronic device in accordance with one or more embodiments of the disclosure.

Turning now to FIG. 8, a user 800 has a finger 801 near the proximity sensor component 108. As the finger 801 is a warm object, it delivers an infrared emission 802 to the proximity sensor component 108. Accordingly, the proximity sensor component 108 transitions the fingerprint sensor 110 from a low-power or sleep mode to an active mode. Turning to FIG. 9, the user 800 places the finger 801 against the fingerprint sensor 110. Accordingly, the fingerprint sensor 110 captures and store fingerprint data from the finger 801 when in the active mode.

In one embodiment, the fingerprint sensor 110 first confirms the finger 801 is actually a finger. Where this is the case, the process of authenticating the user 800 begins. One of several options can occur: First, authentication can be successful. Where this is the case, the fingerprint sensor 110 can wake the one or more processors (116) of the electronic device 100, transitioning the electronic device 100 to an active mode of operation. Alternatively, authentication can be unsuccessful. Where this is the case, the fingerprint sensor 110 can return to the low-power or sleep mode until the proximity sensor component 108 detects another object. In a third case, the user may be unidentified, but the one or more processors (116) may be actuated nonetheless so that the user can authenticate themselves by other techniques, such as by entering a personal identification number. In one embodiment, once the user is authenticated, if the electronic device 100 remains in an active state, i.e., is not left resting on a table or other surface, the user will remain authenticated as it is presumed that the constant motion of the active state results from the electronic device 100 being continually held by the user.

Figure 10:
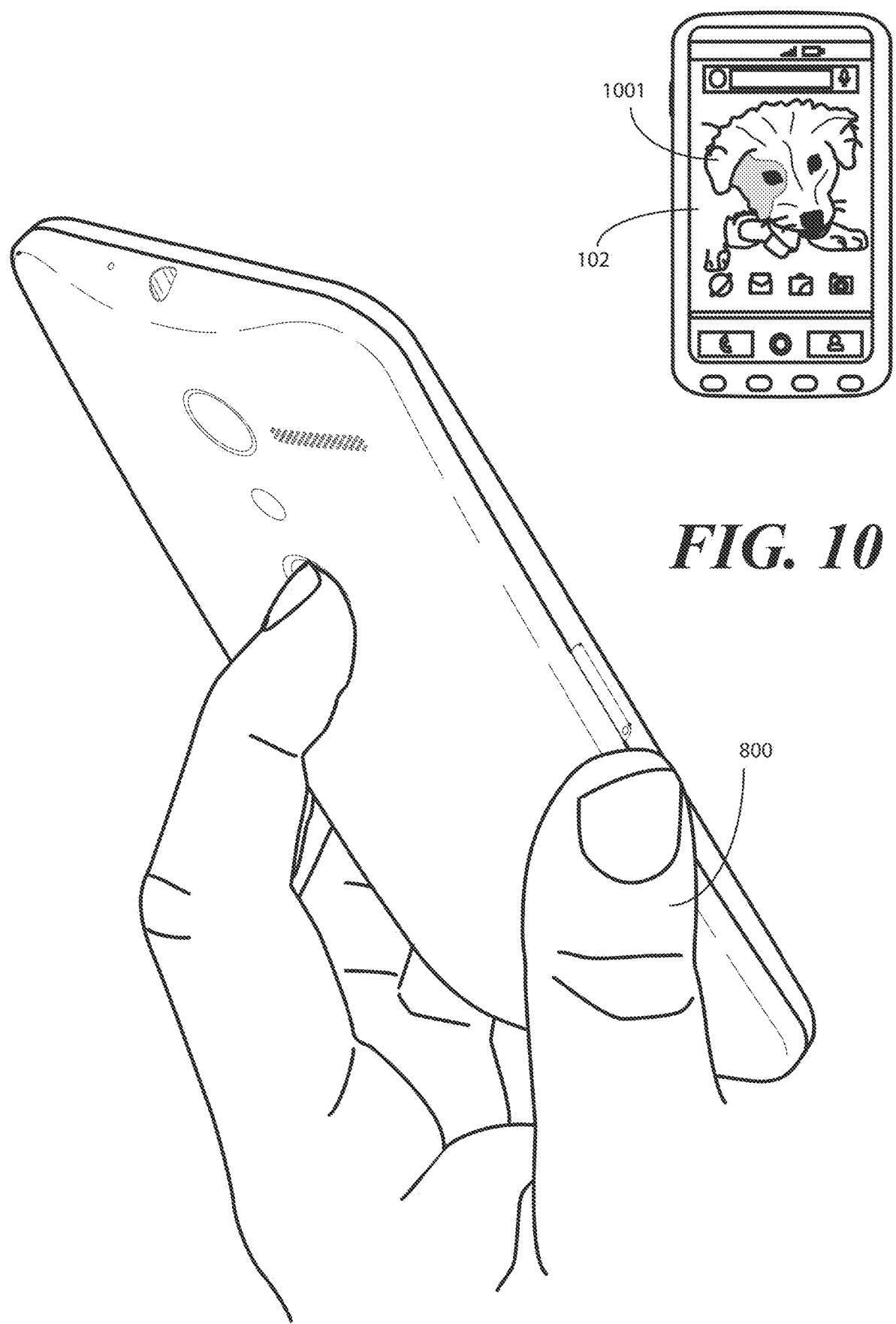
FIG. 10 illustrates one or more explanatory method steps using a portable electronic device in accordance with one or more embodiments of the disclosure.

Turning to FIG. 10, the authentication in this example has been successful. As such, the one or more processors (116) transition to an active mode and the display 102 becomes active. Here, the user 800 is thus able to look at a picture 1001 of their dog, Buster.

Figure 11:
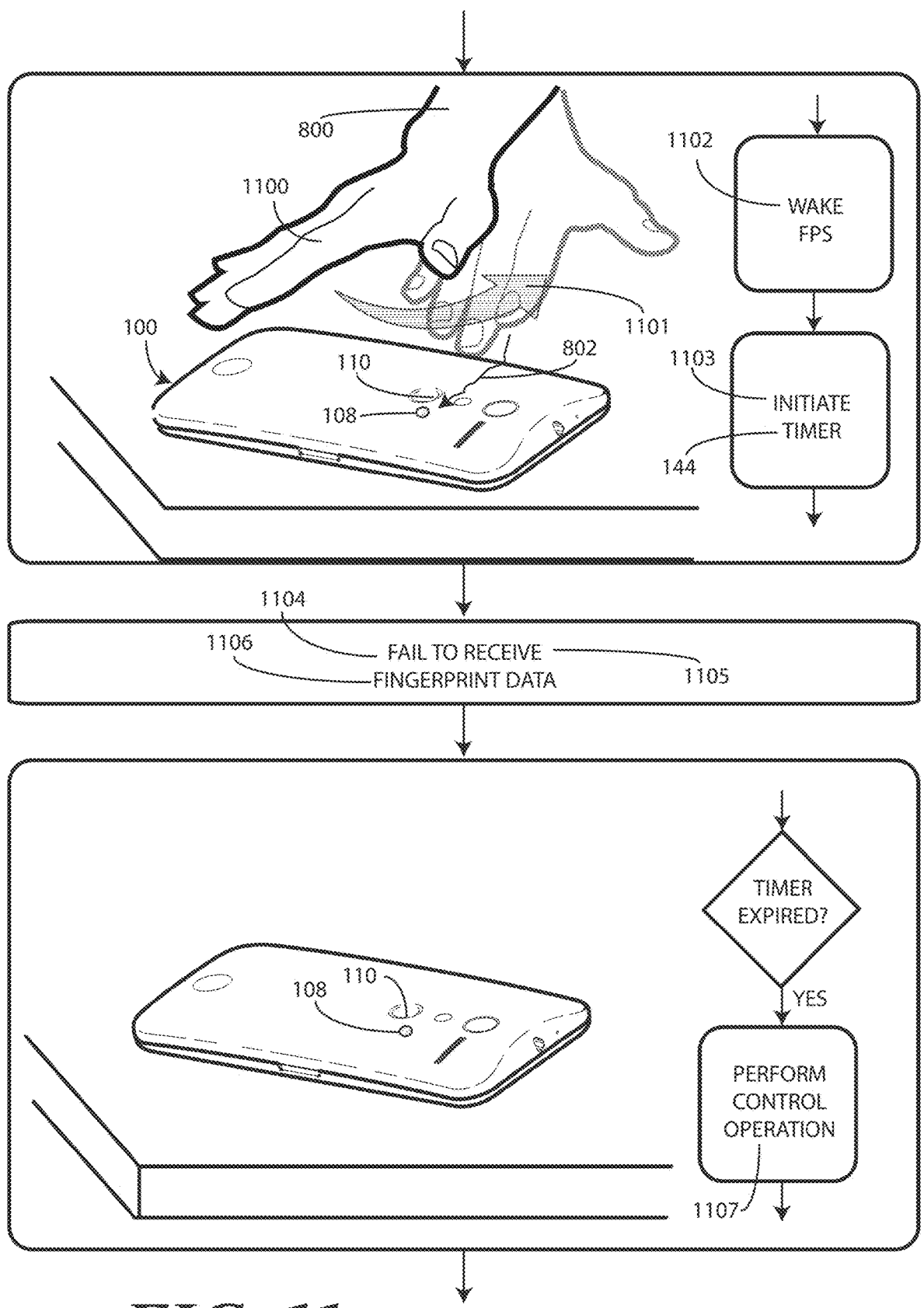
FIG. 11 illustrates one or more explanatory method steps using a portable electronic device in accordance with one or more embodiments of the disclosure.

Turning to FIG. 11, in this example the user 800 merely swipes 1101 their hand 1100 over the electronic device 100. Perhaps the user 800 is delivering gesture input to the electronic device 100. Perhaps the swipe 1101 is accidental. In either event, the proximity sensor component 108 disposed adjacent to the fingerprint sensor 110 receives an infrared emission 802 from the hand. Accordingly, the proximity sensor component 108 wakes 1102 the fingerprint sensor 110 from the low-power or sleep mode. A timer 144 is also initiated 1103.

However, the user 800 never touches the fingerprint sensor 110. Accordingly, the fingerprint sensor 110 fails 1104 to receive 1105 fingerprint data 1106 prior to expiration of the timer 144. In one embodiment, one of the proximity sensor component 108 or the one or more processors (116) of the electronic device 100 therefore perform a control operation 1107. In one embodiment, the control operation 1107 comprises placing the fingerprint sensor 110 back in the low-power or sleep mode.

Figure 12:
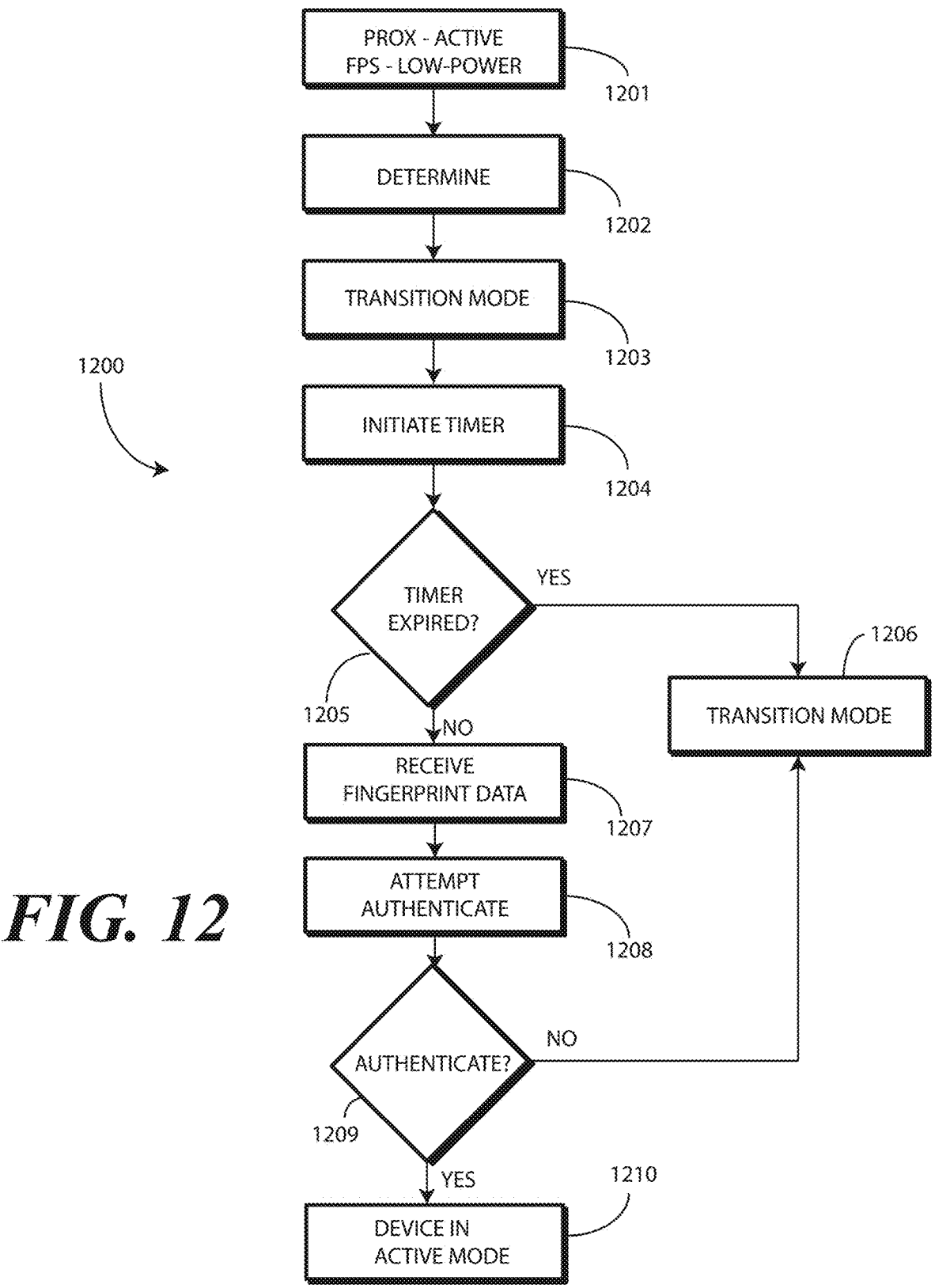
FIG. 12 illustrates one explanatory method in accordance with one or more embodiments of the disclosure.

Turning now to FIG. 12, illustrated therein is one explanatory method 1200 for operating an electronic device 100 in accordance with one or more embodiments of the disclosure. At step 1201, the method 1200 includes operating at least one proximity sensor component in an active mode while a fingerprint sensor is in the low-power or sleep mode.

At step 1202, the method 1200 includes determining, with at least one proximity sensor component proximately located with a fingerprint sensor, a proximity of the object to the fingerprint sensor. In one embodiment, the at least one proximity sensor component comprises an infrared signal receiver to receive an infrared emission from an object external to a housing.

In one embodiment, the infrared signal receiver detects the object at step 1202 when the proximity of the object is less than a predetermined distance from a housing of the electronic device. One example of such a predetermined distance would be less than three inches from the housing.

Other examples of predetermined distances will be obvious to those of ordinary skill in the art having the benefit of this disclosure.

At step 1203, and in response to detecting the proximity of the object, the method 1200 can transition the fingerprint sensor from a low-power or sleep mode to an active mode of operation.

At optional step 1204, the method 1200 can include initiating a timer in response to the at least one proximity sensor component detecting the object at step 1202. In another embodiment, the method 1200 initiates the timer at step 1204 when the object is less than the predetermined distance from the fingerprint sensor.

At optional decision 1205, the method checks to see whether the timer has expired without the fingerprint sensor receiving fingerprint data. Where this is the case, i.e., where the fingerprint sensor fails to capture fingerprint data prior to expiration of the timer, the method 1200 can return the fingerprint sensor to the low-power or sleep mode at step 1206.

At step 1207, the method 1200 can receive, with the fingerprint sensor, fingerprint data. At step 1208, the method 1200 can attempt to authenticate the fingerprint data.

At decision 1209, the method 1200 can determine whether the fingerprint data is authenticated. Where it is, the method 1200 can transition the electronic device to an active mode of operation at step 1210. However, at step 1206 the method 1200 can return the fingerprint sensor to the low-power or sleep mode upon failing to authenticate the fingerprint data.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. An electronic device, comprising:
a housing;
a user interface; and
one or more processors operable with the user interface;
the user interface comprising a fingerprint sensor proximately located with at least one proximity sensor component comprising an infrared signal receiver receiving an infrared emission from an object external to the housing;
the at least one proximity sensor component actuating the fingerprint sensor when the infrared signal receiver receives the infrared emission from the object;
the at least one proximity sensor component disposed about a perimeter of the fingerprint sensor;
the at least one proximity sensor component circumscribing the fingerprint sensor.

2. The electronic device of claim 1, the fingerprint sensor collocated with the at least one proximity sensor component.

3. The electronic device of claim 1, the fingerprint sensor actuating the one or more processors after the infrared signal receiver receives the infrared emission from the object.

4. The electronic device of claim 1, the fingerprint sensor concentrically aligned with the at least one proximity sensor component.

5. The electronic device of claim 1, the at least one proximity sensor component comprising a single proximity sensor component.

6. The electronic device of claim 1, the at least one proximity sensor component actuating a timer when the infrared signal receiver receives the infrared emission from the object.

7. The electronic device of claim 1, the at least one proximity sensor component actuating the fingerprint sensor by transitioning the fingerprint sensor from a low-power or sleep mode to an active mode of operation.

8. The electronic device of claim 1, wherein:
the at least one proximity sensor component actuating the fingerprint sensor when a finger is within a predetermined distance of the fingerprint sensor;
the fingerprint sensor capturing and storing fingerprint data from the finger; and
the one or more processors comparing the fingerprint data to reference data and determine whether the fingerprint data substantially matches the reference data.

9. The electronic device of claim 7, the object comprising a finger, the fingerprint sensor capturing and store fingerprint data from the finger when in the active mode of operation.

10. The electronic device of claim 1, further comprising a timer, one of the infrared signal receiver or the one or more processors initiating the timer when the infrared signal receiver receives the infrared emission, and, where the fingerprint sensor fails ing and storing fingerprint data prior to expiration of the timer, transitioning the fingerprint sensor from an active mode to a low-power or sleep mode.

11. The electronic device of claim 1, the fingerprint sensor comprising a push button.

12. The electronic device of claim 1, the one or more processors operating the fingerprint sensor in a low-power or sleep mode until the infrared signal receiver receives the infrared emission from the object.

13. An electronic device, comprising:
a housing;
a user interface; and
one or more processors operable with the user interface;
the user interface comprising a fingerprint sensor proximately located with at least one proximity sensor component comprising an infrared signal receiver receiving an infrared emission from an object external to the housing;
the at least one proximity sensor component actuating the fingerprint sensor by transitioning the fingerprint sensor to an active mode of operation when the infrared signal receiver receives the infrared emission from the object;
the at least one proximity sensor component disposed about a perimeter of the fingerprint sensor;
the at least one proximity sensor component circumscribing the fingerprint sensor.

14. The electronic device of claim 13, the object comprising a finger, the fingerprint sensor capturing and storing fingerprint data from the finger when in the active mode of operation.

15. The electronic device of claim 14, the one or more processors comparing the fingerprint data to reference data stored in a memory of the electronic device to determine whether the fingerprint data substantially matches the reference data.

16. The electronic device of claim 13, the at least one proximity sensor component comprising a single infrared receiver.

17. The electronic device of claim 13, the at least one proximity sensor component actuating the fingerprint sensor when the object is within three inches from the housing of the electronic device.

18. An electronic device, comprising:
a housing;
a user interface; and
one or more processors operable with the user interface;
the user interface comprising a fingerprint sensor proximately located with at least one proximity sensor component comprising an infrared signal receiver receiving an infrared emission from an object external to the housing;
the at least one proximity sensor component actuating the fingerprint sensor from a low-power or sleep mode when the infrared signal receiver receives the infrared emission from the object;
the at least one proximity sensor component disposed about a perimeter of the fingerprint sensor;
the at least one proximity sensor component circumscribing the fingerprint sensor.

19. The electronic device of claim 18, the actuating of the fingerprint sensor transitioning the fingerprint sensor to an active mode of operation.

20. The electronic device of claim 18, the object comprising a finger, the fingerprint sensor actuating the one or more processors prior to the finger touching the fingerprint sensor.

* * * * *